United States Patent [19]

Cherrington

[11] Patent Number: 5,456,552
[45] Date of Patent: Oct. 10, 1995

[54] METHOD AND APPARATUS FOR INSTALLING PIPE IN HORIZONTAL BOREHOLE

[75] Inventor: Martin D. Cherrington, 8600 Emperor Dr., Fair Oaks, Calif. 95628

[73] Assignee: Martin D. Cherrington, Fair Oaks, Calif.

[21] Appl. No.: 68,207

[22] Filed: May 27, 1993

[51] Int. Cl.⁶ ................................................ F16L 1/028
[52] U.S. Cl. ........................... 405/184; 405/154; 175/62; 175/391; 175/424
[58] Field of Search ................................. 405/154, 184; 175/62, 65, 391, 393, 406, 424

[56] References Cited

U.S. PATENT DOCUMENTS

| | | | |
|---|---|---|---|
| 3,805,899 | 4/1974 | Hicks et al. | 175/62 X |
| 4,452,324 | 6/1984 | Jurgens | 175/393 |
| 4,515,227 | 5/1985 | Cerkovnik | 175/65 |
| 4,673,312 | 6/1987 | Nussbaumer | 405/184 |
| 4,754,526 | 7/1988 | Tremoulet et al. | 175/424 |
| 4,765,416 | 8/1988 | Bjerking et al. | 175/393 X |
| 4,784,231 | 11/1988 | Higgins | 175/393 X |
| 4,819,747 | 4/1989 | Walton et al. | 175/393 X |
| 4,911,579 | 3/1990 | Lutz et al. | 405/184 |
| 4,981,181 | 1/1991 | Hesse | 405/154 X |
| 5,013,188 | 5/1991 | Campbell et al. | 405/184 |
| 5,078,546 | 1/1992 | Fisk et al. | 405/154 X |
| 5,112,158 | 5/1992 | McConnell | 405/154 |
| 5,127,481 | 7/1992 | Hesse | 405/184 X |
| 5,173,009 | 12/1992 | Moriarty | 405/154 |

FOREIGN PATENT DOCUMENTS

| | | | |
|---|---|---|---|
| 286734 | 2/1966 | Australia | 175/393 |
| 2137719 | 10/1984 | United Kingdom | 405/154 |

Primary Examiner—Randolph A. Reese
Assistant Examiner—John A. Ricci
Attorney, Agent, or Firm—Vinson & Elkins

[57] ABSTRACT

Apparatus is provided for installing a pipeline in borehole comprising a pulling pipe drawn by a drill string and an articulating joint coupling the pulling pipe to the pipeline. The articulating joint allows an angle to be formed between the pulling pipe and the pipeline. A reamer is used to clear the borehole as the pipeline is installed. The reamer includes a plurality of radially-oriented nozzles for directing fluid away from the stem of the reamer in order to clean the teeth of the reamer without directing the cuttings and other debris toward areas in which accumulation is likely to occur. Deflecting nozzles prevent the outermost radially-oriented nozzles from overcutting the borehole.

24 Claims, 3 Drawing Sheets

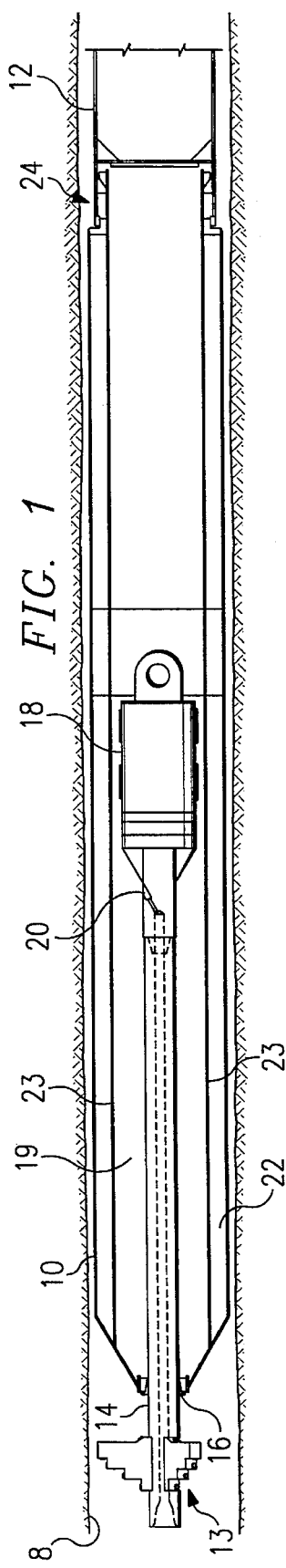
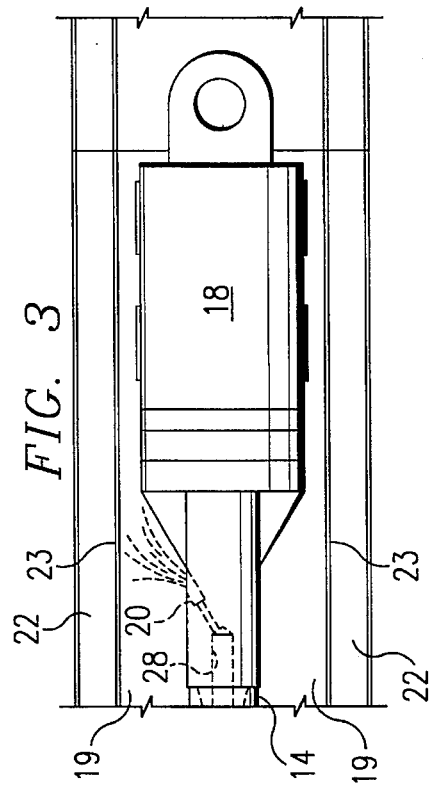
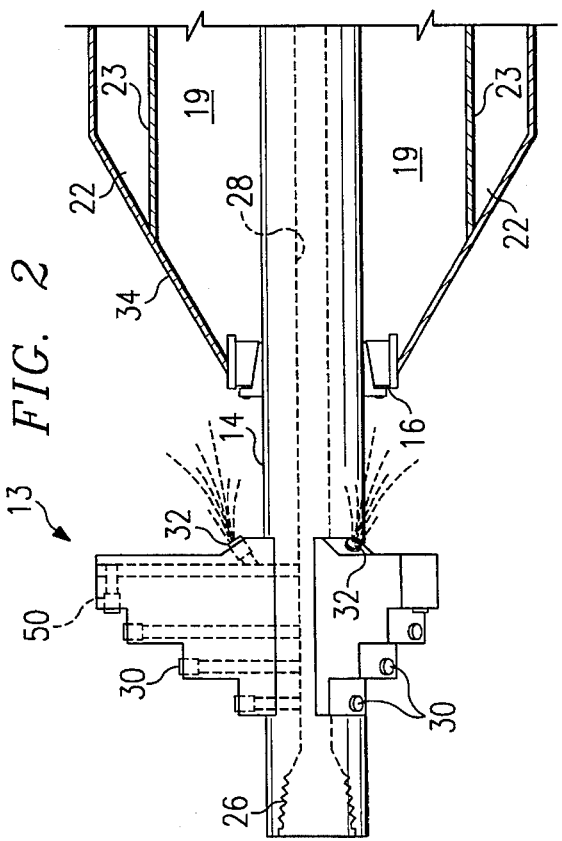

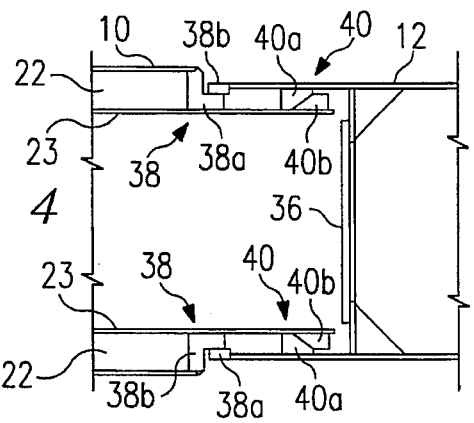
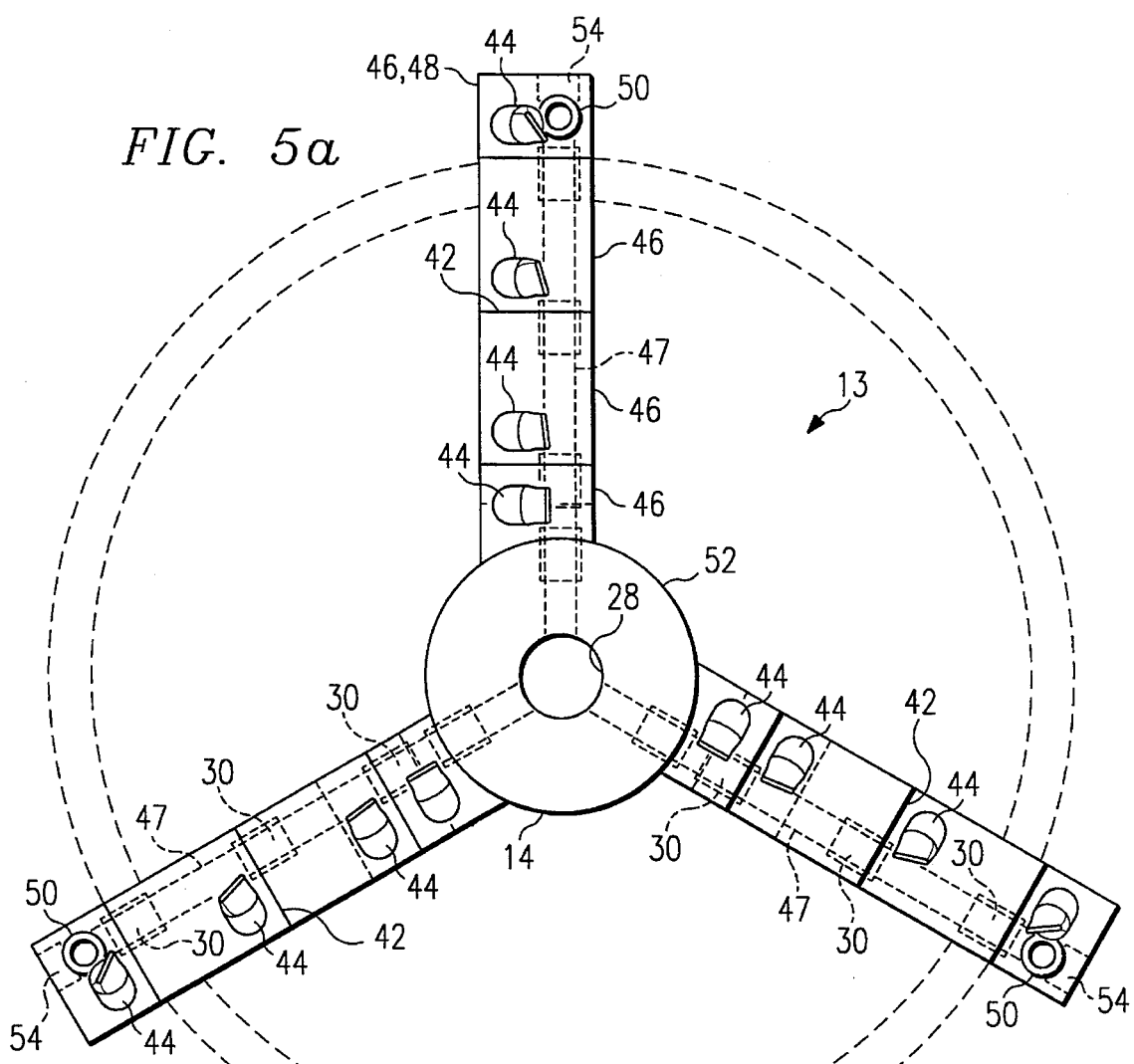

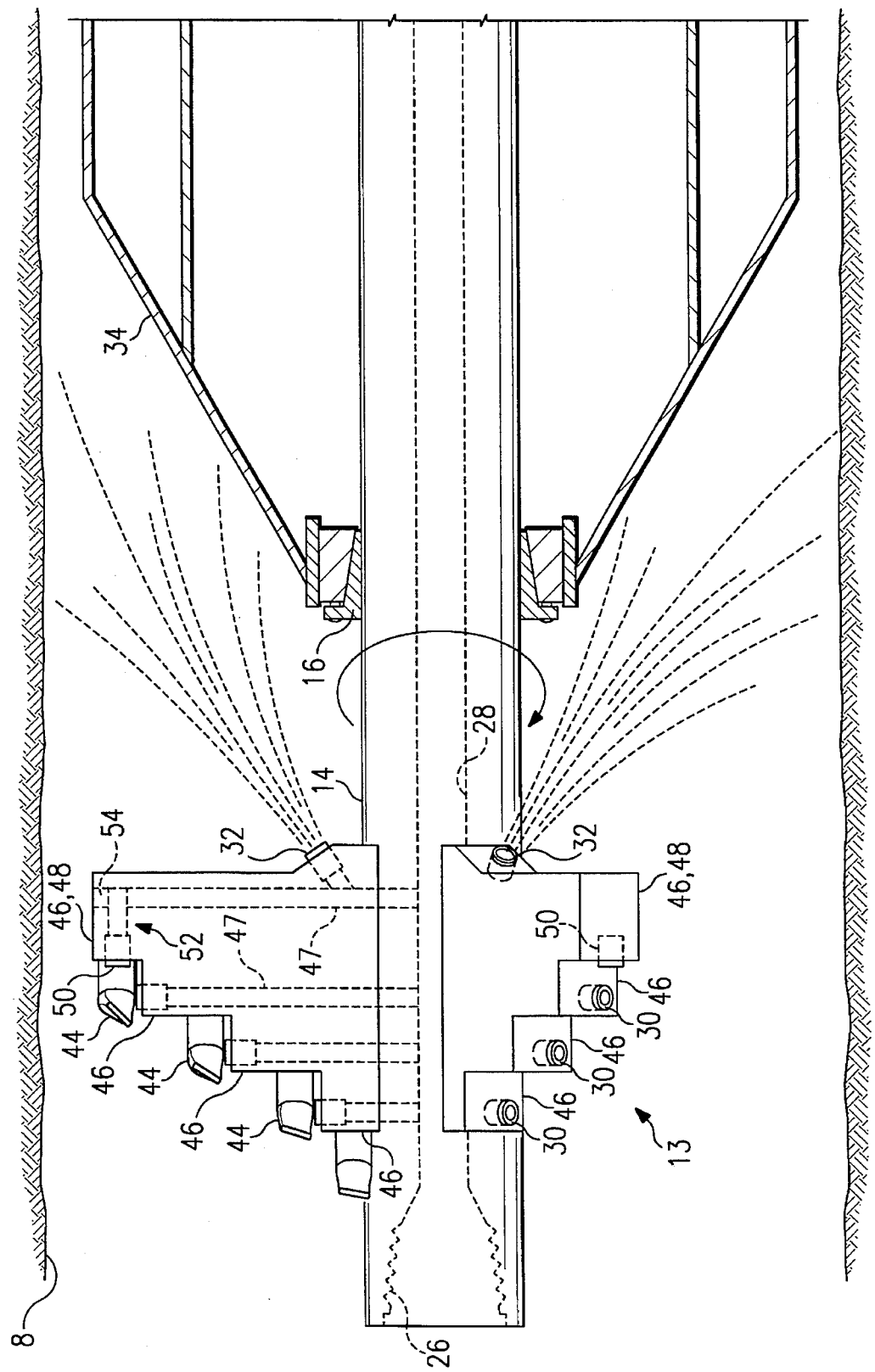

METHOD AND APPARATUS FOR INSTALLING PIPE IN HORIZONTAL BOREHOLE

CROSS REFERENCE TO RELATED APPLICATIONS

This application is related to U.S. application Ser. No. 07/789,356 to Cherrington, filed Nov. 8, 1991, entitled "Method and Apparatus for Cleaning a Borehole," now U.S. Pat. No. 5,269,384.

TECHNICAL FIELD OF THE INVENTION

This invention relates in general to horizontal pipelines and more particularly to a method and apparatus for installing a pipe in a horizontal borehole.

BACKGROUND OF THE INVENTION

Underground conduits are widely used for the transmission of fluids, such as in pipelines and the like, as well as for carrying wires and cables for the transmission of electrical power and electrical communication signals. While the installation of such conduits is time consuming and costly for locations where the each can be excavated from the surface, the routing of such conduits becomes more difficult where such surface excavation cannot be done due to the presence of surface obstacles through which the excavation cannot easily proceed. Such surface obstacles include highways and railroads, where the installation of a crossing conduit would require the shutdown of traffic during the excavation and installation. Such surface obstacles also include rivers, which present extremely difficult problems for installing a crossing conduit, due to their size and the difficulty of excavation thereunder.

Prior methods for the installation of conduits have included the use of directional drilling for the formation of an inverted underground arcuate path extending between two surface locations and under the surface obstacle, with the conduit installed along the drilled path. A conventional and useful method for installing such underground conduits is disclosed in U.S. Pat. No. 4,679,637, issued Jul. 14, 1987, assigned to Cherrington Corporation, and incorporated herein by this reference. This patent discloses a method for forming an enlarged arcuate bore and installing a conduit therein, beginning with the directional drilling of a pilot hole between the surface locations and under a surface obstacle such as a river. Following the drilling of the pilot hole, a reamer is pulled with the pilot drill string from the exit opening toward the entry opening, in order to enlarge the pilot hole to a size which will accept the conduit, or production casing in the case of a pipeline conduit. The conduit may be installed during the reaming operation, by the connection of a swivel behind the reamer and the connection of the conduit to the swivel, so that the conduit is installed as the reaming of the hole is performed. Alternatively, the conduit can be installed in a separate operation, following the reaming of the pilot hole (such reaming referred to as "pre-reaming" of the hole). In cases where the conduit is installed in a separate operation, it is desirable to remove cuttings from the hole prior to installing the conduit. An examples of a hole cleaning device for removing cuttings may be found in U.S. application Ser. No. 07/789,356, to Cherrington. Additional examples of the reaming operation, both as pre-reaming and in conjunction with the simultaneous installation of the product conduit, are described in U.S. Pat. No. 4,784,230, issued Nov. 15, 1988, assigned to Cherrington Corporation and incorporated by this reference.

One problem in drilling the borehole concerns the reaming operation. The reamer includes a number of teeth which grind the earth as the reamer is pulled through the pilot hole. Cuttings from the reaming operation become lodged in the teeth and prematurely deteriorate the reamer and can cause sticking. Therefore, many reamers include a cleaning system to spray the teeth with drilling fluid to remove the debris. Unfortunately, the fluid spray from existing cleaning systems directs the debris towards the stem of the reamer and towards the front of the reamer, The debris is thus directed to areas where accumulation may occur. The accumulation is particularly troublesome in clay soils where balls of clay easily form. The balls of clay impede movement of the reamer and any attached conduit.

A second problem involves the transport of the conduit through the hole. Even where the hole is cleaned prior to installing the conduit, sticking may occur during the installation process when the pipe is drawn through the hole. While the conduit is flexible in its central portions, the leading end is relatively inflexible. Thus, curves in the hole may result in the leading edge of the conduit driving into the sidewalls of the hole. If the conduit becomes stuck in the sidewall, operations to free the conduit must be undertaken, thereby increasing the cost of the project.

Therefore, a need has arisen in the industry for installing a conduit in a horizontal hole which reduces problems associated with conduit sticking.

SUMMARY OF THE INVENTION

In a first aspect of the invention, apparatus for provided for installing a pipeline in borehole comprising a pulling pipe drawn by a drill string and an articulating joint coupling said pulling pipe to the pipeline. The articulating joint allows an angle to be formed between said pulling pipe and the pipeline. In the preferred embodiment, a reamer is used to clear the borehole as the pipeline is installed.

In a second aspect of the invention, a sealed chamber is formed in the pulling pipe to provide buoyancy to the pulling pipe to offset the weight of connecting apparatus disposed within the pulling pipe.

In a third aspect of the invention, the reamer includes a plurality of radially-oriented nozzles for directing fluid away from the stem of the reamer in order to clean the teeth of the reamer without directing the cuttings and other debris toward areas in which accumulation is likely to occur. Deflecting nozzles prevent the outermost radially-oriented nozzles from overcutting the borehole. Nozzles located in the rear of the reamer generate a plane of lubricating fluid which enhances the movement of the pulling pipe within the hole.

The present invention, in view of the preferred embodiments, provides significant advantages over the prior art. First, during installation of a pipeline, the articulating joint allows the pulling pipe to bend relative to the pipeline in response to curves and other perturbations in the borehole. Consequently, sticking due to lodging of the pipeline in the sidewalls of the borehole is greatly reduced. Second, the buoyancy achieved by the sealed chamber offsets the weight of the pulling pipe and associated connecting apparatus, thus reducing or eliminating forces which would drive the pulling pipe downward in the hole where sand and cutting may have settled. Third, the reamer shown in the preferred embodiment forces debris away from the stem of the reaming apparatus to location where it is less likely to accumulate. Fourth, the slip plane created by the nozzles at the rear of the reamer further reduce the possibility of sticking.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a side view of a pulling pipe used to guide a trailing pipe in a horizontal borehole;

FIG. 2 illustrates a side view of the step reamer assembling and pilot bearing used in the pulling pipe of FIG. 1;

FIG. 3 illustrates a swivel assembly used in the pulling pipe of FIG. 1;

FIG. 4 illustrates the joint assembly used to connect the pulling and trailing pipes in FIG. 1; and FIGS. 5a–b illustrate front and side views of a preferred embodiment of the step reamer attached to the pulling pipe in FIG. 1.

DETAILED DESCRIPTION OF THE PREFERRED EMBODIMENTS

The present invention is best understood by referring to FIGS. 1–5 of the drawings, like numerals being used for like and similar parts of the various drawings.

The present invention, as shown by the preferred embodiment discussed in detail below, reduces factors which cause sticking. In a first aspect, the problem with the inability of the pipeline to conform to the contours of a hole is addressed by pulling the pipeline with a leading pipe which is connected to the pipeline with an articulating joint.

FIG. 1 illustrates a cross-sectional side view of a hole 8 in which a pulling pipe 10 and trailing pipeline 12 are disposed. The pulling pipe 10 is coupled to step reamer 13 via stem 14, which enters the pulling pipe 10 through bearing 16 and is attached to swivel 18 in the interior chamber 19 of pulling pipe 10. An interior passage 28 is formed through stem 14 for transporting a lubricating fluid to the interior of pulling pipe 10. The fluid is released to the interior of pulling pipe 10 through nozzle 20 and through the reamer 13, as described below.

An airtight outer chamber 22 formed by wall 23 and the outer wall of the pulling pipe 10 surrounds the interior chamber 19. The pulling pipe 10 is coupled to pipeline 12 through articulated joint 24. In the preferred embodiment, the articulated joint 24 allows approximately three degrees or less of articulation between the pulling pipe 10 and the pipeline 12, although the necessary amount of articulation will depend upon the length of the pulling pipe 10 (it is generally desirable to have more articulation with a shorter pulling pipe) and the contours of the borehole.

In operation, the reamer 13 is coupled to a leading drill string, which is rotated and withdrawn by a drill rig on the surface. The hole 8, which has been previously enlarged and cleaned, in the preferred embodiment, typically has a diameter which is greater than the gauge of the reamer by 35–50%. The reamer is thus used to clear the hole 8 as it is pulled, but is preferably not used to enlarge the hole, which would result in additional cuttings being formed. In the preferred embodiment, the gauge of the reamer 13 is approximately the same as the outer diameter of the pulling pipe 10 and several inches in diameter greater than the outer diameter of pipeline 12.

As the reamer 13 is rotated, the stem 14 is rotated in bearing 16 and swivel 18. Therefore, the pulling pipe 10 is not subjected to rotational forces on the reamer 13. Drilling fluid is transmitted into the interior chamber 19 where it flows through bearing 16 to cool and lubricate the bearing 16.

The optimum length of the pulling pipe will vary on a number of factors including the diameter of the pulling pipe and the curvature of the hole 8. As a rule of thumb, a pulling pipe length of approximately ten times the diameter of the pulling pipe may be used as a starting point. Thus, for an exemplary 40" outer diameter pipeline, the reamer would have a gauge of approximately 42"–44" and the pulling pipe 10 would have a corresponding outer diameter of about 42"–44". The length of the pulling pipe would be 37' to 40'. As would be clear to one skilled in the art, the length of the pulling pipe 10 is thus significantly less than the length of the pipeline 12.

As the pulling pipe 13 is drawn through the hole 8, curves and other contours in the hole 8 will be encountered by the pulling pipe 10. In response to these impediments, the joint 24 will provide a bending point between the pulling pipe 10 and the front of the pipeline 12, both of which are relatively inflexible. This bending provides relief from forces which would otherwise drive the pulling pipe 10 into the sidewalls of the hole 8 and possibly result in the pulling pipe 10 becoming stuck in the hole 8.

Because a significant amount of drilling fluid will be present in hole 8 during reaming operations, the airtight chamber 22 provides buoyancy to the pulling pipe 10 to maintain the pipe in the center of the hole 8, to the extent possible. This buoyancy offsets the weight of the swivel 18. Without the airtight chamber 22, the weight of the swivel would provide a downward force on the pulling pipe toward the sand and cuttings which have settled on the bottom of hole 8, which would increase the possibility of sticking. While the airtight chamber is highly desirable, with a pulling pipe 10 having a small outer diameter, it may not be possible to provide an airtight chamber 22.

FIG. 2 illustrates a more detailed cross-sectional side view of forward section of pulling pipe 10. In the preferred embodiment, bearing 16 is a polycrystal bearing. As can be seen, the flow of lubricant from the interior chamber of the pulling pipe 10 cools and lubricates the bearing 16.

The reamer 13 is also shown in greater detail in FIG. 2. The reamer 13 is coupled to the drill string via threaded connection 26. An interior passage 28 is formed through reamer 13 and stem 14 for transporting fluid to the interior chamber and to nozzles 30 and 32 on the reamer 13. The nozzles 30 are discussed in greater detail in connection with FIGS. 5a–b. The purpose of the nozzles 30 is to remove debris from the cutting edges of reamer 13.

As can be seen in FIG. 2, the leading edge 34 of pulling pipe 10 is generally conical in shape. The conical shape reduces sticking as the pipe 10 is drawn through the hole 8. Nonetheless, especially in clay situations, debris in the hole 8 can accumulate form solid balls which impede movement of the pulling pipe 10. Nozzles 32 create a rotating stream of fluid which forms a lubricating plane (or "slip plane") in the general conical shape of the leading edge 34 of the pulling pipe and reduces the buildup of debris.

FIG. 3 illustrates a more detailed cross section of the pulling pipe 10 at swivel 18. Swivel 18 is positioned in the approximate middle of the pulling pipe 10 to prevent forces which would either drive the forward or rearward end of the pulling pipe 10 downward. Nozzle 20 is in fluid communication with interior passage 28 to force fluid into the interior chamber 19.

FIG. 4 illustrates a cross-sectional side view of the connection between the pulling pipe 10 and the pipeline 12. Pipeline 12 is capped with bulkhead 36 to prevent fluid and other debris from entering the interior of the pipeline 12. Joint 24 comprises butt joint 38 and spherical bearing 40. Butt joint 38 comprises cylindrical reinforcements 38a and 38b which are formed around the peripheries of the trailing end of pulling pipe 10 and the forward end of pipeline 12, respectively. In response to a compressive force, reinforcement 38a is forced against reinforcement 38b, thereby absorbing the thrust between the pulling pipe 10 and the pipeline 12.

Spherical bearing 40 comprises portions 40a and 40b coupled to the pipeline 12 and the wall 23, respectively. Portion 40a has a contoured surface which is generally spherical in shape. Portion 40b corresponds in shape to portion 40a such that the two portions may rotate relative to each other in any direction. In response to a tension load, portion 40a will compress against portion 40b. In response to a radial (articulating) force, such as would be encountered as the pulling pipe 10 is pulled through a curved portion of hole 8, spherical bearing 40 will allow articulation between the pipeline 12 and pulling pipe 10 to form a bending at the joint 24 in any direction. This bending will allow the combination of the pulling pipe 10 and the pipeline 12 to conform to a directional change in the hole 8 as the pulling pipe 10 and pipeline 12 are pulled through the hole 8, thereby reducing the opportunity for either the pulling pipe 10 or pipeline 12 to become lodged in the sidewall of the hole 8.

Along with allowing articulation between the pulling pipe 10 and pipeline 12, the joint 24 will also allow rotation of the pulling pipe 10 independent of the pipeline 12 in the event that the swivel 18 were to partially or completely fail. Any rotational forces imparted to said pulling pipe 10 will be absorbed by the joint 24.

FIGS. 5a–b illustrates front and side views, respectively, of a preferred embodiment of the reamer 13. The reamer 13 includes three arms 42 welded to stem 14. In the preferred embodiment, each arm 42 is formed from a solid block of steel. Each arm includes one or more cutting teeth 44 formed on each step 46. A fluid borehole 47 is formed through each Step, orthogonal to stem 14, terminating in a nozzle 30. Nozzles 30 direct the fluid radially away from the stem 14. The outermost step 48 has a nozzle 50 which is directed perpendicular to the nozzles 30 and communicates with the borehole 47 via borehole 52. On the outermost step borehole 47 terminates at the periphery of the reamer 13 with plug 54. Nozzles 32, discussed in connection with FIG. 2, are also coupled to the borehole 47 associated with the outermost step 46.

The radial nozzles 30 perform a number of functions which are beneficial to the reaming operation. First, the nozzles clean the teeth 44. In the illustrated embodiment, drag type teeth 44 are used. The nozzles 30 direct fluid in front of respective teeth 44. During the reaming operation, the teeth 44 will scrape away the earth from the sidewalls of the hole 8. As the earth is scraped away, balls of soil will be formed in front the teeth 44, which are subsequently washed away by the spray from nozzles 30. Because the nozzles 30 force the debris on the teeth towards the sidewalls of the hole 8 rather than towards the front of the reamer 13 or towards the stem 14, where solid balls of debris material may accumulate, a smooth passage is provided between the pipes 10 and 12 and the hole 8 for removal of the debris. Second, the nozzles are directed toward the sidewall of the hole 8 and may aid in cutting the formation through the hole 8.

As shown in FIGS. 5a–b, a nozzle is provided for the innermost teeth by placing the nozzle within the stem 14. In some cases, this may cause weakness in the stem in the general area of the weld. Therefore, it may be desirable to provide alternate cleaning means for the innermost teeth, such as providing a jet sub in front of the reamer to flood the area of the innermost teeth with drilling fluid.

Another important feature of the reamer 13 shown in FIGS. 5a–b is the deflecting nozzles 50. The deflecting nozzles 50 direct a stream of fluid transverse to the fluid released from the outermost radial nozzles 30 of each arm. The interaction between the deflecting nozzles 50 and the outermost radial nozzles 30 is causes a deflected stream of fluid with less energy than an undeflected stream from the other radial nozzles. The reduced energy stream of fluid is less likely to cause overcutting of the hole 8. Overcutting can result in excess material which can cause sticking.

Also shown in FIG. 5a is an optional ring 52 which can be used to add strength to the arms 42. In the preferred embodiment, the ring 52 comprises three steel arcs coupled between the arms 42. While the ring 52 increases the strength of the arms 42, it can also enhance the accumulation of debris, and thus increase sticking, particularly in clay soils.

It should be noted that while the reamer 13 has been discussed in connection with the installation of a pipeline in a pre-reamed hole, it is equally suitable and advantageous to use the reamer of FIGS. 5a–b in enlarging operations through native soil.

Although the Detailed Description of the invention has been directed to certain exemplary embodiments, various modifications of these embodiments, as well as alternative embodiments, will be suggested to those skilled in the art. For example, other joint connections could be used to provide the articulation between the pulling pipe 10 and the pipeline 14. Further, the radial jets could be used with other configurations of cutting members than those shown in FIGS. 5a–b. Also, the degree of articulation needed in a particular situation may vary from the preferred embodiment of three degrees stated herein.

The invention encompasses any modifications or alternative embodiments that fall within the scope of the Claims.

What is claimed is:

1. Reaming apparatus comprising:
    a stem having a fluid passageway formed therein;
    a plurality of arms extending outwardly from the stem;
    a plurality of cutting devices formed in each arm; and
    a plurality of radially-oriented nozzles in fluid communication with said passageway for producing respective streams of fluid radially outward from said stem proximate each of said cutting devices to wash debris therefrom.

2. The reaming apparatus of claim 1 and further comprising one or more deflecting nozzles for generating a stream of fluid for deflecting the stream of fluid produced by corresponding ones of said radially-oriented nozzles.

3. The reaming apparatus of claim 2 wherein said radially-oriented nozzles are positioned on each of said arms from an innermost nozzle closest to said stem to an outermost nozzle furthest from said stem, said deflecting nozzles positioned to deflect the stream of fluid produced by the outermost nozzle.

4. The reaming apparatus of claim 1 wherein said reamer has a leading edge and a trailing edge and further comprising one or more nozzles disposed on the trailing end to create a lubricating plane of fluid responsive to rotation of the reamer.

5. The reaming apparatus of claim 1 had further comprising a plurality of fluid passageways formed through said arms for coupling said fluid passageway of said stem to said nozzles.

6. A method of reaming a borehold comprising the steps of of:

removing soil to form the borehole with a plurality of cutting devices formed on a reamer;

transporting fluid through the stem of said reamer; and directing the fluid through a plurality of radially oriented nozzles coupled to the reamer and in fluid communication with said passageway for producing a stream of fluid radially outward from said stem proximate each cutting device of said reamer to wash debris therefrom.

7. The method of claim 6 and further comprising the step of generating one or more streams of fluid to deflect respective streams of fluid produced by ones of said radially-oriented nozzles to reduce the energy of the streams.

8. The method of claim 7 wherein said deflecting step comprises the step of deflecting the stream of fluid produced by an outermost radially-oriented nozzle.

9. The method of claim 6 and further comprising the step of directing a stream of fluid from one or more nozzles disposed on the trailing end of the reamer to create a lubricating plane of fluid responsive to rotation of the reamer.

10. Apparatus for installing a pipeline in borehole, comprising:

a reamer for coupling to a drill;

a pulling pipe coupled to said reamer;

an articulating joint coupling said pulling pipe to the pipeline, said articulating joint allowing an angle to be formed between said pulling pipe and the pipeline;

a swivel disposed within said pulling pipe coupled to a stem of said reamer to allow said reamer to rotate independent of said pulling pipe; and a bearing coupled to said pulling pipe through which the stem is disposed.

11. The apparatus of claim 10 wherein said articulating joint includes a first joint allowing relation in any direction.

12. The apparatus of claim 11 wherein said articulating joint includes a second joint for absorbing forces between said pulling pipe and the pipeline while said pulling pipe and the pipeline are in compression.

13. The apparatus of claim 10 wherein the pulling pipe has an outer diameter greater than the pipeline.

14. The apparatus of claim 10 and further comprising a sealed chamber formed within said pulling pipe for providing buoyancy.

15. The apparatus of claim 10 and further comprising a fluid passageway formed through said stem for providing a fluid to the interior of said pulling pipe.

16. Apparatus for installing a pipeline in borehole, comprising:

a pulling pipe for coupling to a drill string, said pulling pipe including a sealed chamber for providing buoyancy; and an articulating joint coupling said pulling pipe to the pipeline, said articulating joint allowing an angle to be formed between said pulling pipe and the pipeline.

17. Reaming apparatus comprising:

a stem having a fluid passageway formed therein;

a plurality of arms extending outwardly from the stem;

a plurality of cutting devices formed in each arm;

a plurality of radially-oriented nozzles in fluid communication with said passageway for producing respective streams of fluid radially outward from said stem proximate each of said cutting devices to wash debris therefrom, wherein said radially-oriented nozzles are positioned on each of said arms from an innermost nozzle closest to said stem to an outermost nozzle furthest from said stem; and one or more deflecting nozzles for deflecting the stream of fluid produced by the outermost nozzle.

18. A method for installing a pipeline in borehole, comprising the steps of:

coupling a pulling pipe to the pipeline with an articulating joint, said pulling pipe having a sealed chamber formed therein to provide buoyancy; and pulling a drill string attached to the pulling pipe such that the said articulating joint allows an angle to be formed between said pulling pipe and the pipeline responsive to curves in the borehole.

19. The method of claim 18 wherein said coupling step comprises the step of coupling the pulling pipe to the pipeline with an articulating joint including a first joint allowing rotation in any direction.

20. The method of claim 19 wherein said coupling step comprises the step of coupling the pulling pipe to the pipeline with an articulating joint further including a second joint for absorbing forces between said pulling pipe and the pipeline while said pulling pipe and the pipeline are in compression.

21. The method of claim 18 wherein said coupling step comprises the step of coupling a pulling pipe with an outer diameter greater than the pipeline to the pipeline.

22. The method of claim 18 and further comprising the step of coupling a reamer between said pulling pipe and the drill string.

23. The method of claim 22 and further comprising the step of coupling a swivel between said reamer and said pulling pipe to allow said reamer to rotate independent of said pulling pipe.

24. A method of reaming a borehole comprising:

transferring fluid through a plurality of radially-oriented nozzles disposed on a reamer for producing respective streams of fluid for removing debris from cutting devices formed on said reamer, wherein said radially-oriented nozzles are positioned on each of said arms from an innermost nozzle closest to said stem to an outermost nozzle furthest from said stem; and deflecting the stream of fluid produced by the outermost nozzle with a stream of fluid directed at an angle to the stream of fluid produced by the outermost nozzle.

\* \* \* \* \*

UNITED STATES PATENT AND TRADEMARK OFFICE
CERTIFICATE OF CORRECTION

PATENT NO. : 5,456,552
DATED : October 10, 1995
INVENTOR(S) : Martin D. Cherrington It is certified that error appears in the above-indentified patent and that said Letters Patent is hereby corrected as shown below:

Col. 7, ln. 10, delete second occurrence of "of".

Signed and Sealed this

Thirtieth Day of April, 1996

Attest:

BRUCE LEHMAN

Attesting Officer

Commissioner of Patents and Trademarks